Patented Apr. 2, 1946

2,397,760

UNITED STATES PATENT OFFICE 2,397,760

RECOVERY OF HYDROGEN HALIDE

Albert J. Shmidl, Houston, Tex., assignor to Standard Oil Development Company, a corporation of Delaware No Drawing. Application June 26, 1943, Serial No. 492,452

9 Claims. (Cl. 23—154)

The present invention is directed to the recovery of hydrogen halides from gases containing them.

It has already been proposed to subject gases containing hydrogen halides to scrubbing or washing with a hydrocarbon liquid carrying in suspension a salt capable of forming an addition compound with hydrogen halide. An anhydrous copper salt, such as copper sulfate, is commonly used for this purpose. This mode of operation offers substantial advantages over the previously known methods of contacting the gases with dry copper sulfate or similar salt, or with inert bodies carrying such salts.

There are certain disadvantages, however, attending the hydrocarbon suspension method, as heretofore practiced. One of these is the fact that because these salts are crystalline in structure and their surface only is effective in the desired action, the recovery of hydrogen halide per unit weight of salt is low. Another disadvantage is the tendency of such salts to settle out in the suspension, which necessitates the use of agitating means or the employment of relatively high rates of flow in order to maintain the desired suspension.

According to the present invention, the aforesaid hydrocarbon suspension method for hydrogen halide recovery is improved by using the metal salt in the form of a thin film on the surface of fine clay or diatomaceous earth or other porous material having a low specific gravity and a high ratio of surface to volume. The metal salt may be deposited on the carrier by any of the methods commonly known in the art for the preparation of supported catalysts. For example, the clay or other finely divided material may be immersed in a solution of the salt and then filtered and dried. As a particular example, diatomaceous earth of 200-300 mesh may be coated with a copper sulfate film by placing a weighed amount of diatomaceous earth in naphtha, adding copper sulfate to the mixture in the form of a water or alcohol solution, thoroughly agitating the mixture, filtering out the solid, and drying it at 300-500° F. to remove water of hydration.

The coated carrier is then used in suspension in an inert solvent, such as $CCl_4$ or kerosene for contacting a gas mixture containing hydrogen chloride or other halide. Other hydrocarbon solvents, particularly those of the paraffinic type, may be employed. Relatively low-boiling paraffin hydrocarbons, such as hexane, heptane, and the like, are particularly suited for this purpose.

In practice, the method of the present invention is quite similar to the known method, in which the crystalline catalyst is employed. Whereas, however, the known method usually involved the employment of about 25 per cent by weight of anhydrous copper sulfate, based on the hydrocarbon solvent utilized in the absorption step, the present method involves only a small fraction of this amount of copper salt, the bulk of the solid matter being made up of carrier. It is advantageous to use an amount of carrier plus metal salt constituting from 5 per cent to 25 per cent by weight of the hydrocarbon employed. The upper limit of the amount of solid is dictated by the viscosity which may be tolerated in the resulting suspension. Generally, the suspension will contain from about 5 per cent to 15 per cent of the solid and usually the copper sulfate will constitute from 2 per cent to 10 per cent by weight of the solid.

The present process is carried out in two stages, an absorption stage and a desorption stage. The conditions in the absorption stage should embrace temperatures in the range of 60° F. to 100° F. at atmospheric pressure. The absorption may be carried out at higher pressures, up to about 350 pounds per square inch or higher. Temperatures in excess of 100° F. may be employed, particularly when the higher pressures are maintained. In any case, of course, the temperature should not be such as to cause vaporization of the hydrocarbon absorption medium.

In the desorption stage the pressure may vary widely, depending on the pressure of the inlet gas to the absorption stage. The temperatures found most useful in the desorption stage are those ranging between 325° and 380° F. The actual upper limit is that dictated by the dissociation temperatures of the components of the absorption mixture and the melting point of the copper sulfate or equivalent salt. The fact that some of the solvent employed may vaporize at the desorption temperature is immaterial, since it can easily be recovered from the evolved gases by condensation. It is preferred, however, to use a solvent which contains no components boiling as low as the highest temperature encountered in the desorption stage. It is also desirable to employ an anhydrous solvent for carrying the anhydrous metal salt in order to avoid the formation in the system of aqueous hydrogen chloride, which would lead to corrosion difficulties.

In the most common embodiment of the present invention the gas to be scrubbed is passed upwardly through a contacting zone countercurrent to a downwardly descending mixture of solvent and supported metal salt. The contacting zone should be provided with interior equipment of known character, such as bubble cap plates, or it may be filled with surface materials, such as balls or rings or lumps of inert material. It will be clear, of course, that other methods for securing contact between the gas and the absorption medium may be resorted to.

While particular mention of clays has been made in the foregoing description, it will be understood that other solid carriers may be employed in the practice of the present invention. Particularly useful are the various types of activated carbon and coke. These materials, when finely ground, tend to form stable suspensions with oil. A particularly useful material in this capacity is expanded vermiculite or mica, which is extremely light and which, in finely divided form, will remain suspended in oil for a considerable period.

The nature and objects of the present invention having been thus described, what is claimed as new and useful and is desired to be secured by Letters Patent is:

1. A process for recovering a hydrogen halide from admixture thereof with other gases which comprises contacting the hydrogen halide-containing gas with a suspension of an anhydrous metal salt having a high absorption capacity for the hydrogen halide, supported in the form of a thin film on a light carrier suspended in an anhydrous liquid of organic character inert to hydrogen halide, and then subjecting the said suspension containing an absorbed hydrogen halide to desorption conditions.

2. A process according to claim 1 in which the hydrogen halide is hydrogen chloride.

3. A process according to claim 1 in which the anhydrous liquid is a hydrocarbon.

4. A process according to claim 1 in which the anhydrous liquid is a paraffinic oil.

5. A process according to claim 1 in which the metal salt is copper sulfate.

6. A process according to claim 1 in which the metal salt is copper sulfate and the anhydrous liquid is a paraffinic oil.

7. A process according to claim 1 in which the carrier is clay.

8. A process according to claim 1 in which the carrier is a finely divided carbonaceous material.

9. A process according to claim 1 in which the carrier is an expanded vermiculite.

ALBERT J. SHMIDL.